United States Patent [19]

Studer

[11] 4,416,541
[45] Nov. 22, 1983

[54] PROCESS AND DEVICE FOR THE MEASUREMENT OF A PHYSICAL QUANTITY OF AN EXTRUDED ELEMENT

[75] Inventor: Urs P. Studer, Riehen, Switzerland

[73] Assignee: Zumbach Electronic AG, Orpund, Switzerland

[21] Appl. No.: 258,952

[22] Filed: Apr. 30, 1981

[30] Foreign Application Priority Data

May 8, 1980 [CH] Switzerland .................. 3593/80

[51] Int. Cl.³ ............................................. G01B 11/04
[52] U.S. Cl. ..................................... 356/386; 250/571
[58] Field of Search ............... 356/384, 385, 386, 387, 356/429, 430, 431, 124, 30, 33; 250/560, 571

[56] References Cited

U.S. PATENT DOCUMENTS

| 3,822,096 | 7/1974 | Wilms et al. | 356/124 |
| 3,829,220 | 8/1974 | Parkinson | 356/387 |
| 3,905,705 | 9/1975 | Petrohilos | 356/387 |
| 3,907,440 | 9/1975 | Eichenberger et al. | 356/429 |
| 3,970,857 | 7/1976 | Buckson | 356/431 |
| 4,097,849 | 6/1978 | Taylor | 356/385 |
| 4,245,517 | 1/1981 | Barker et al. | 356/386 |
| 4,265,545 | 5/1981 | Slaker | 356/431 |

FOREIGN PATENT DOCUMENTS 110757  4/1962  Czechoslovakia .................. 356/124

*Primary Examiner*—R. A. Rosenberger

[57] ABSTRACT

For the measurement of a dimension of an object in a liquid, windows are provided in a vessel containing the liquid and the object, and parts of an optical measuring apparatus for the determination of the dimension of the object are arranged in the region of the window. This measuring arrangement can be fitted on to an existing installation without substantial expense. An open vessel, into which the object must be inserted, thus remains freely accessible. Since the window is constantly in contact with the liquid, no optical interruptions can occur which would falsify the measurement.

6 Claims, 5 Drawing Figures

PROCESS AND DEVICE FOR THE MEASUREMENT OF A PHYSICAL QUANTITY OF AN EXTRUDED ELEMENT

BACKGROUND OF THE INVENTION

The present invention relates to a process and device for the measurement of a physical quantity of an extruded element preferably running through a cooling bath.

In the production of extruded synthetic plastics products or in the coating of conductors in the production of a cable, it is desired to determine the dimensions of the extruded element as soon as possible after they issue from the extruder, in order to correct possible errors as quickly as possible. The dimensions should be determined within the cooling bath directly connected with the extrusion nozzle rather than after the exit from the cooling bath. There are, however, various difficulties in effecting the measurement in the cooling bath. A measuring device projecting into the cooling bath from above not only hinders the introduction of the element into the cooling bath but also requires a certain minimum width of the cooling trough. It is difficult to effect a measurement without immersing components of the apparatus in the cooling trough, since the upper surface of the cooling liquid is turbulent and thus an exact optical measurement is impossible.

SUMMARY OF THE INVENTION

It is an object of the present invention to provide a process and an apparatus which enables an exact measurement of a dimension of an object in a liquid, more especially an extruded element running through a cooling bath, without the abovementioned disadvantages and difficulties.

The invention accordingly provides a process for the measurement of a dimension of an extruded element in a cooling bath, wherein the measurement of said dimension is effected in a contact free manner through at least one boundary bordering a side of the liquid in the cooling bath.

The or each boundary is preferably constructed as a window in the vessel containing the liquid, through which window the dimension will be measured. Generally two windows will be provided in oppositely disposed walls of the vessel and the dimension will be measured through these windows. In order to prevent the abovementioned effect of the turbulent, free upper surface of the liquid, a transparent plate can if necessary be applied to the liquid, to enable an optical measurement of the dimension to be carried out therethrough.

DESCRIPTION OF THE PREFERRED EMBODIMENTS

Figure 1:
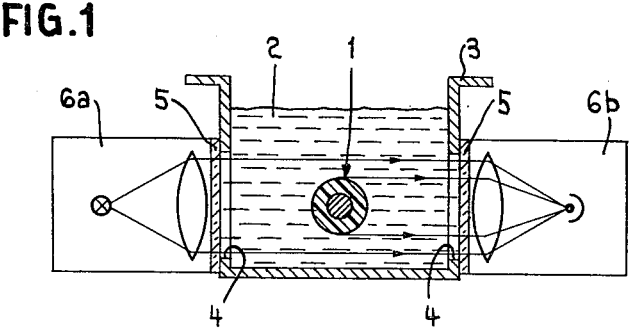
FIGS. 1 to 4 each show diagrammatically a respective embodiment of the device for carrying out the process in accordance with the invention.

In FIG. 1 there is shown a cable 1 which has been provided with an insulating covering in an extruder and is led in the direction of its longitudinal axis through a cooling bath 2 in an upwardly open cooling trough 3. The lateral walls of the cooling trough are provided with oppositely disposed openings 4, the edges of each of which are sealed by an external window 5. The window 5 can be either part of the trough 3 or part of a corresponding built-on component 6a or 6b of the apparatus. The components 6a and 6b together form a measuring apparatus for the determination of the diameter of the cable 1. The construction and operation of the measuring apparatus are not the subject of the present invention, and any desired optical measuring instrument can be used which enables the diameter to be determined with the necessary accuracy. Two kinds of measuring apparatus will be described briefly with the aid of FIGS. 2 and 3.

The measuring process and apparatus according to FIG. 1 comprises various advantages. The cooling trough 3 remains unobstructed from above and is freely accessible so that the beginning of the cable 1 can be led into the cooling trough and pulled through the same without any hindrance. The free surface of the cooling liquid 2 is rendered turbulent, especially during the introduction of the cable 1, but also later as a result of the movement of the cable. However this has no effect upon the measurement, since, owing to the presence of the flat parallel window 5 and the fact that the cooling liquid directly contacts the latter, there can be no uncontrolled optical interruption, and thus no falsification of the measurement readings can occur. The apparatus according to FIG. 1 can be fitted onto an existing cooling trough at small expense. It is only necessary to cut out suitable openings 4 and to provide on the side walls appropriate fastening means for the additional parts 6a and 6b of the apparatus.

Figure 2:
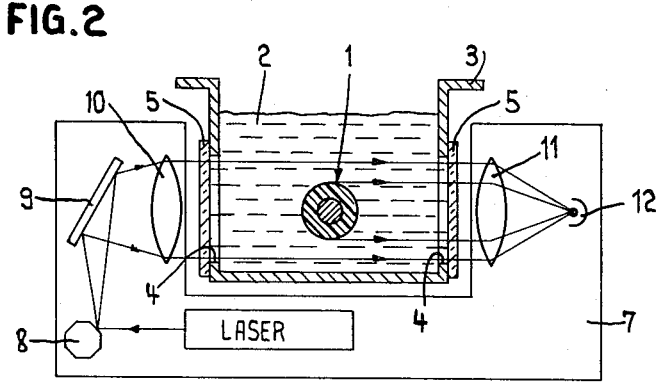
Figure 3:
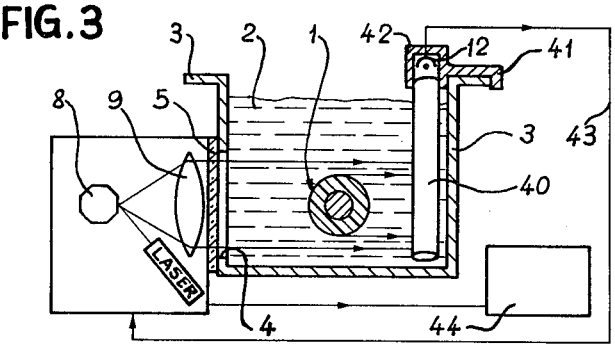

FIG. 2 shows an embodiment similar to that shown in FIG. 1, wherein corresponding parts are indicated with the same reference numerals as in FIG. 1. The cooling trough 3 is provided with windows 5, and engages within the measuring field of a measuring instrument 7, which is shaped to form a throat surrounding the cooling trough 3. As shown in FIG. 2, in one part of the apparatus a laser beam is periodically deflected by way of a rotating polygonal mirror 8 and is deflected across the object 1 at a predetermined speed by way of a mirror 9 and a lens 10. The beam is conducted through a condenser lens 11 to a photoelectric transducer 12, and the output signal is so processed that from the duration of the interruption of the beam by the object, the dimension of the object is ascertained. The construction according to FIG. 2 can also be applied to an existing system without substantial expanse and can make use of an existing measuring apparatus. FIG. 3 shows an embodiment which corresponds for the most part to that of FIG. 2, like parts being indicated in FIG. 3 with the same reference numerals as in FIG. 2. In place of the receiver part 11, 12 of the measuring apparatus, the arrangement according to FIG. 3 comprises, in the plane of movement of the laser beam, a translucent, diffuse light scattering body 40, for example of opalescent glass, which is suspended by means of a holder 41. This body 40 is at the upper end tightly connected with a housing 42 in which there is located a photocell which is connected by way of a lead 43, with an electronic measuring circuit located in the transmitting part of the measuring apparatus. The electronic measuring circuit is in turn connected with a display and/or control apparatus 44. The method of operation of the measuring device according to FIG. 3 corresponds with that according to FIG. 2. As long as the laser beam passes through the cooling liquid 2, it produces a diffuse illumination in the body 40 which also influences the photocell 12, which then yields a signal that is clearly distinguishable from a quiescent signal that occurs when the laser beam does not pass through the window 5 or is interrupted by the object 1. The arrangement according to FIG. 3 has the advantage that only one window 5 on one side of the cooling trough needs to be provided.

Figure 4:
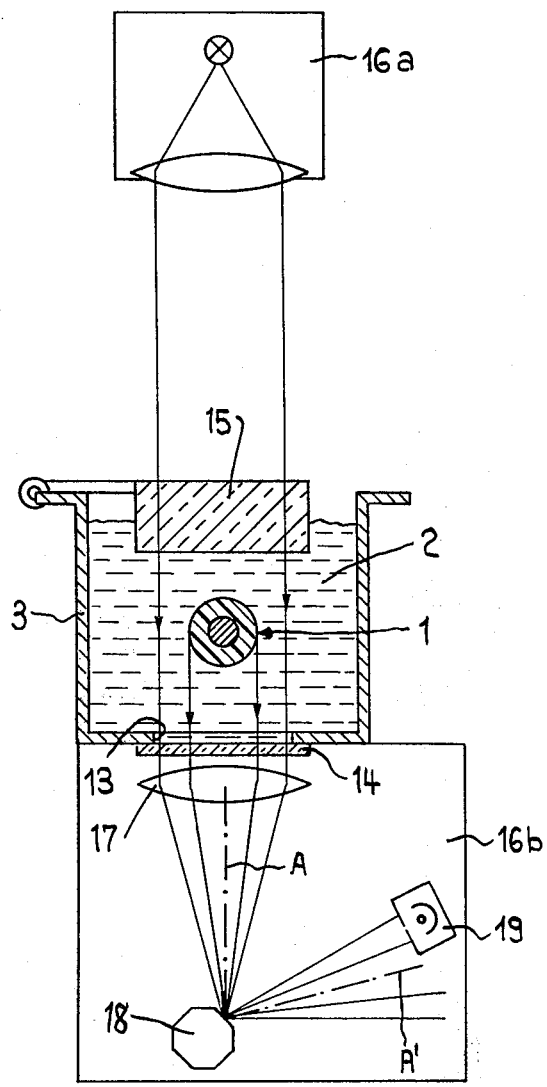

FIG. 4 shows a further arrangement, in which corresponding parts are again indicated within the same reference numerals as in FIG. 1. The cooling trough 3 is provided in its base with an opening 13 which is sealed by means of a flat parallel window 14. On one edge of the trough 3 there is pivotably arranged a flat parallel glass plate 15. Above the plate 15 there is arranged one part 16a of a measuring apparatus which serves to project a beam of parallel light rays through the plate 15 into the region of the object 1. Below the trough 3 there is located a receiving part 16b of the measuring apparatus with a condenser lens 17, a rotating polygonal mirror 18 and a photoelectric transducer 19. The photoelectric transducer 19 is arranged in a housing with a small entry slot.

In the illustrated operating position the plate 15 contacts the free upper surface of the cooling liquid 2 and dips into the latter sufficiently far that its underside is constantly in full contact with the liquid. No optical interruption can thus occur at this point to disturb the light beam. The transmitted light beam is projected through the slot onto the photoelectric transducer by means of the rotating mirror, so that the illumination of the transducer is interrupted as long as the gap produced in the light beam by the object 1 is projected onto the slot in the housing of the transducer. The resulting electrical signal thus also comprises an interruption which corresponds to the dimension of the object 1.

To enable the introduction of the object 1, the plate 15 can be swung upwardly or outwardly, and the part 16a of the apparatus can be temporarily removed as necessary in order to introduce the object 1.

While the invention has been described above in relation to the example of the covering of a cable conductor or wire in an extruder, other objects can naturally be correspondingly measured, for example extruded pipes or other profiles, or other objects in a different context. Different measuring devices can also be used. Although in the illustrated examples optical windows are provided, appropriate windows can be provided for other rays which are suitable for the measurement of the dimension of a particular object. Finally, it would also be possible to construct the housing for the liquid from a material which is transparent to a predetermined radiation of the measuring apparatus, in which case no special windows would need to be provided.

A combination of the embodiments according to FIGS. 3 and 4 would be possible, wherein the transmitting part 16b of the measuring device according to FIG. 4 is equipped with a plate 15 according to FIG. 4, which can be raised and lowered from above, and the receiving part 40, 42, 12 according to FIG. 3 is arranged on the base of the cooling trough 3 without the holder 41, the lead 43 being led upwardly along one side wall of the trough to the transmitter part 16b, which also contains the electronic measuring circuit. In this case no alteration of the cooling trough, and in particular no window in a wall or base thereof, is necessary.

Instead of the intruding diffuse light scattering body 40 according to FIG. 3 a suitable mirror system can also be used.

Figure 5:
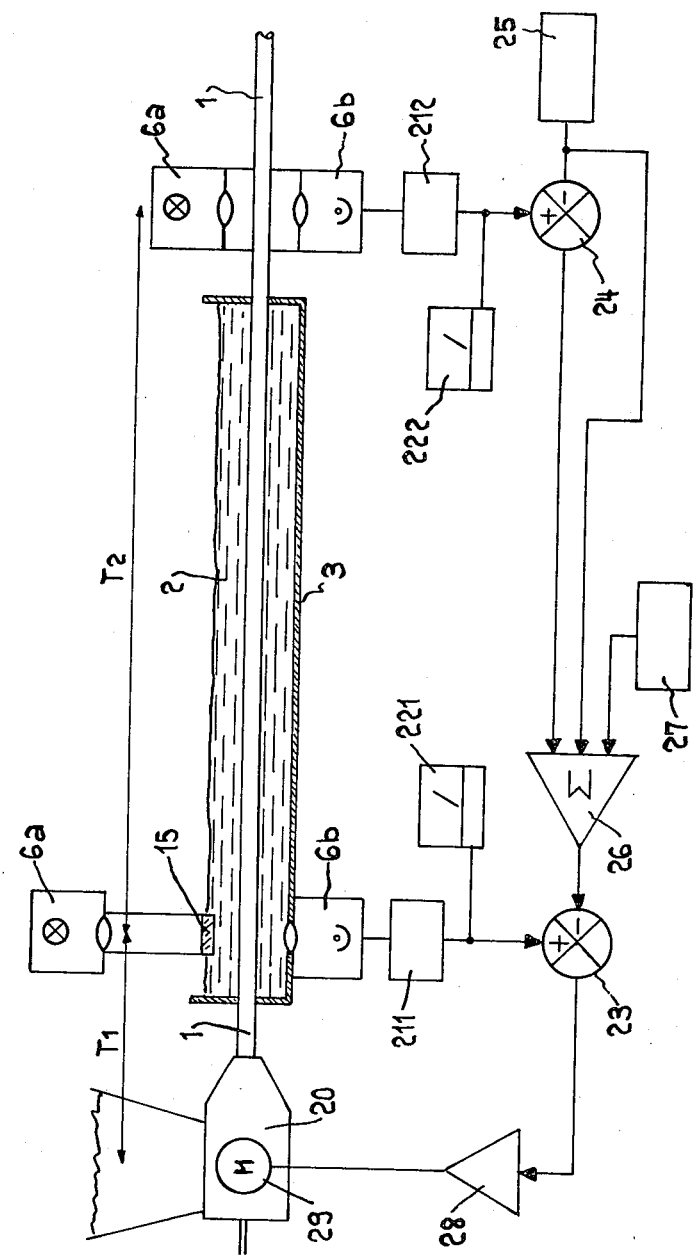
FIG. 5 shows an example of an application of an embodiment of the process in accordance with the invention.

FIG. 5 shows diagrammatically one example of an application of the above described process and of an illustrated apparatus. Corresponding parts are indicated with the same reference numerals as in FIGS. 1 to 4. Two measuring apparatus are provided, each of which comprises parts 6a and 6b and of which one is arranged as close as possible to the entry of the cable 1 into the cooling bath 2 while the other is arranged beyond the cooling bath and in any case at a position where the cable is fully cooled. The cable 1 is coated in an extruder 20 and enters into the cooling bath directly after its exit from the extruder. The output of the electronic circuit 211 of the measuring apparatus in the region of the cooling bath is connected with an indicating instrument 221 and with one input of a comparator circuit 23. The output of the electronic circuit 212 of the measuring apparatus arranged beyond the cooling bath is connected with an indicating instrument 222 and with one input of a comparator circuit 24. The other input of the comparator circuit 24 is connected with a reference value transmitter 25, which yields a signal corresponding to the reference value of the diameter of the cooled cable. This reference value is applied directly to one input of a summing circuit 26. A further input receives the output signal of the comparator circuit 24, which signal corresponds to the variation of the measured diameter of the cooled cable from the reference value. Finally, a signal from a shrinkage value transmitter 27 is also fed to the summing circuit 26, which signal corresponds to the shrinkage of the diameter of the cable between the two measurement positions. The corrected reference value signal appearing at the output of the summing circuit 26 is applied to the comparator circuit 23. A control signal corresponding to the variation of the output signal of the electronic circuit 211 from the output signal of the summing circuit 26 is transmitted to the extruder by way of an amplifier 28 and there controls a setting motor 29.

The advantage of this arrangement is that a first determination of the outer diameter of the cable is effected within a very short time $T_1$ after coating of the cable has been effected and thus a first regulation can be effected very quickly. Large variations from the reference value are therefore corrected very quickly. Subsequently, after a certain delay $T_2$, an additional regulation of the exact reference value of the cooled cable is effected by way of the control stage 212, 24, 26. It should be noted that in practice the ratio between the distances or times $T_2$ and $T_1$ is greater than is indicated diagrammatically in FIG. 5.

I claim:

1. Process for automatic control of a physical quantity of an extruded element issueing from an extruder in a hot condition and cooling down gradually as it moves away from said extruder to reach a cooled condition, by means of a first and a second regulating loop in which said first regulating loop comprises the measurement of said quantity carried out on said element in the hot condition in the close vicinity of an exit of said extruder for quickly regulating and correcting variations from a first reference value and said second regulating loop comprises the measurement of said quantity carried out on said element in the cooled condition for providing an auxiliary regulation of said quantity with respect to a second reference value of said element in the cooled condition.

2. Process according to claim 1, wherein said extruded element passes through a cooling bath and said quantity to be measured is a dimension of said element, said measurement in the first regulating loop being carried out on said element in said cooling bath and said measurement in the second regulating loop being carried out on the element in the cooled condition, outside of said cooling bath.

3. Process according to claim 2, wherein said measurement in the first regulating loop is effected optically through a flat parallel-sided transparent plate which is located upon a free upper surface of said bath.

4. Device for an automatic control of a physical quantity of an extruded element issueing from an extruder in a hot condition and cooling down gradually as it moves away from said extruder to reach a cooled condition, comprising a first and a second regulating loop, said first regulating loop comprising a measuring apparatus arranged in the close vicinity of an exit of said extruder for measuring said quantity on the element in said hot condition, for quickly regulating and correcting variations from a first reference value, said second regulating loop comprising an apparatus for measuring said quantity on the element in said cooled condition for providing an auxiliary regulation of said quantity with respect to a second reference value of the element in said cooled condition.

5. Device according to claim 4, wherein said extruded element passes through a liquid cooling bath and said quantity to be measured is a dimension of said element, comprising a vessel for receiving the liquid and said element to be measured, said measuring apparatus of the first regulating loop is an optically measuring apparatus a part of which is located below a window in the base of said vessel and a second part of said measuring apparatus is located above a flat parallel-sided transparent plate disposed opposite to said window upon the free surface of the liquid cooling bath within the vessel.

6. Device according to claim 5, wherein said first regulating loop comprises said optically measuring apparatus which is connected to a first comparator receiving a first reference signal from a summing circuit, the output of said first comparator is connected to an adjusting motor of said extruder, said second regulating loop comprising a second optically measuring apparatus located outside said vessel and connected to a second comparator receiving a second reference signal, the output of said second comparator is connected to said summing circuit which also receives said second reference signal and a shrinkage signal.

* * * * *